United States Patent [19]

Sigman et al.

[11] 4,175,834
[45] Nov. 27, 1979

[54] LASER MIRROR WITH COOLANT FLUID TRANSFER MANIFOLD

[75] Inventors: Warren R. Sigman, North Palm Beach; Robert K. Stalcup, Palm Beach Gardens, both of Fla.

[73] Assignee: United Technologies Corporation, Hartford, Conn.

[21] Appl. No.: 899,626

[22] Filed: Apr. 24, 1978

[51] Int. Cl.$^2$ ............................................. G02B 7/18
[52] U.S. Cl. .................................................. 350/310
[58] Field of Search ........ 350/310; 285/190, DIG. 25

[56] References Cited

U.S. PATENT DOCUMENTS

| | | | |
|---|---|---|---|
| 2,400,658 | 5/1946 | Shepherd | 285/190 |
| 3,594,019 | 7/1971 | Gotschall | 285/190 |

*Primary Examiner*—Jon W. Henry
*Attorney, Agent, or Firm*—Lawrence A. Cavanaugh

[57] ABSTRACT

A pressure balancing fluid transfer manifold for use with fluid cooled laser mirrors is disclosed. The manifold is adapted for connection to the inlet and outlet ports of a fluid cooled laser mirror and includes an interface fitting adapted for being fixedly connected to a mounting plate which supports the laser mirror and a housing fixedly attached to the mirror wherein the interface fitting is sealably engaged within the housing with O-ring type seals. Elongated slots within the walls of the fitting are adapted for passing coolant from the fitting to the mirror coolant distribution system. Hydraulic pressures within the fitting are decoupled from the mirrors by a vented cavity located between the end of the fitting and the mirror and the pressure forces are transmitted through the fitting to the mounting plate thereby minimizing distortion of the mirror resulting from unbalanced pressure forces. In one embodiment the interface fitting is coupled directly to the coolant distribution system within the mirror.

13 Claims, 6 Drawing Figures

LASER MIRROR WITH COOLANT FLUID TRANSFER MANIFOLD

The invention herein described was made in the course of or under a contract or subcontract thereunder with the Department of the Air Force.

BACKGROUND OF THE INVENTION

This invention relates to laser mirrors and more particularly to a coolant transfer manifold for minimizing the effect of hydraulic pressures generated by the coolant on the mirror alignment.

The utilization of fluid cooled mirrors in laser systems has enabled the reflective surface to withstand high energy density beams incident thereon without deterioration. Laser mirrors having passages adapted for passing a coolant fluid therethrough are disclosed in U.S. Pat. No. 3,637,296 filed June 4, 1970 and U.S. Pat. No. 3,854,799 filed Jan. 26, 1973, both held with the present application by a common assignee. Although cooling the laser mirror has enabled high power operation to be achieved, the hydraulic pressures generated by the coolant passing into the laser mirror and the unbalanced pressures generated between the coolant entrance chamber and the coolant exit chamber of the laser mirror produces a distortion of the reflective surface and a resulting misalignment of the laser. Eitel in U.S. Pat. No. 4,029,400 filed Nov. 25, 1975 disclosed a cooled laser mirror assembly which includes a cooled laser mirror and mounting structure for isolating hydraulic pressure loads from the mirror and the mounting structure and to balance the hydraulic forces caused by the coolant so that the mirror and the support structure will not have any significant loads placed thereon by the coolant to interfere with the mirror operation. Additionally Nachtman in U.S. Pat. No. 4,006,972 and Zanotti et al in U.S. Pat. No. 4,006,973 both filed May 12, 1975 disclosed a cooled laser mirror assembly and mounting structure wherein a laser mirror is mounted in a housing with at least one coolant flow transfer tube assembly extending into the mirror with its outer portion being fixedly connected to the mounting structure.

SUMMARY OF THE INVENTION

A primary object of the present invention is to provide a pressure balancing fluid transfer manifold for use with a mirror adapted for being cooled to minimize misalignment of the mirror resulting from hydraulic pressure loads of a coolant passing through the mirror.

According to the present invention a fluid transfer manifold adapted for isolating a structure from hydraulic pressure loads resulting from a coolant flowing through the structure comprises a housing having a first passage, a second passage adapted for communicating with a heat exchanger distribution system for passing coolant within the structure, a third passage internal to the housing connecting the first and second passage and adapted for passing coolant therebetween, means for attaching the housing to the structure, and means for venting the first passage; and an interface fitting adapted for partial insertion into the first passage, wherein the interface fitting has a cylindrical body with a bore extending from a first end adapted for connection to a source of coolant, and terminates short of a second end of the fitting, a plurality of slots circumferentially disposed about the cylindrical body proximate to the second end adapted for passing the coolant between the bore and the third passage within the housing, and means for attaching the interface fitting to a mounting plate adapted for supporting the structure.

A feature of the present invention is a cavity formed within the first passage between the second end of the interface fitting and the back surface of the structure. The cavity is maintained at atmospheric pressure through the vent means located within a side wall of the housing. Additionally, the interface fitting has a slip fit engagement within the first passage utilizing an O-ring type engagement. Also a protrusion from the housing having the second passage located therein is adapted for a slip fit engagement with the structure for passing coolant therebetween. In the preferred embodiment one fluid transfer manifold is attached to the coolant entrance port of the structure and a second fluid transfer manifold is attached to the coolant exit port of the structure. In the preferred embodiment the structure is a mirror adapted for use with high power laser radiation.

An advantage of the present invention is that the fluid transfer manifold isolates the mirror from coolant line hydraulic loads and minimizes distortion to the mirror surface resulting from the hydraulic loads. Additionally the utilization of fluid transfer manifolds on the coolant entrance and exit ports of the structure minimizes unbalanced pressure loads generated by the coolant flowing through the structure which additionally minimizes distortion of the mirror surface. The O-ring type engagement minimizes distortions due to interface fitting misalignment with the housing. Additionally the fluid transfer manifold is adapted for removable attachment to a structure to provide ease of handling and storage and is of a simple design resulting in lower manufacturing costs than prior art devices.

The foregoing and other objects, features and advantages of the present invention will become more apparent in the light of the following detailed description of preferred embodiments thereof as discussed and illustrated in the accompanying drawing.

DESCRIPTION OF THE PREFERRED EMBODIMENT

Figure 1:
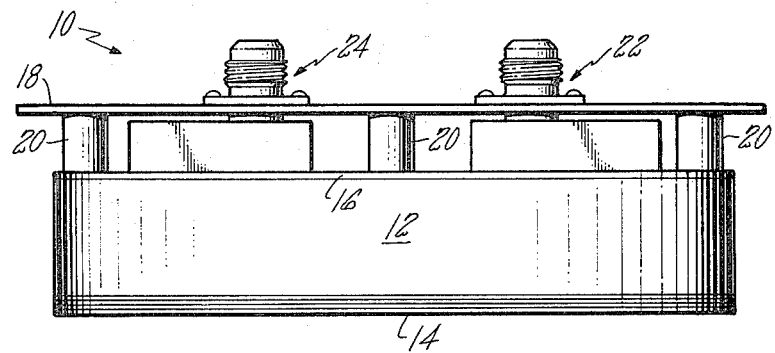
FIG. 1 is a side view of a laser mirror assembly having the present invention attached to the coolant entrance and exit ports of the mirror.

The lasser mirror assembly 10 as shown in FIG. 1 includes a mirror 12 adapted for having coolant flowing therethrough and having a reflective surface 14 and a backplate 16, a structural mounting plate 18 adapted for holding the mirror, mount pads 20 typically located one hundred twenty degrees apart along the periphery of the mirror for fixing the mirror to the mounting plate, a first pressure balancing fluid transfer manifold 22 adapted for passing coolant into the mirror and a second pressure balancing transfer manifold 24 adapted for passing coolant out of the mirror, both fixedly attached to the mounting plate and to the backplate 16 of the mirror. The mounting plate 18 and the mount pads 20 are well known in the art and the mirror 12 may be of any of the water cooled designs well known in the art having coolant entrance and exit ports adapted for receiving the present invention such as is disclosed in U.S. Pat. Nos. 3,645,608, 3,637,296 and 3,854,799.

Figure 2:
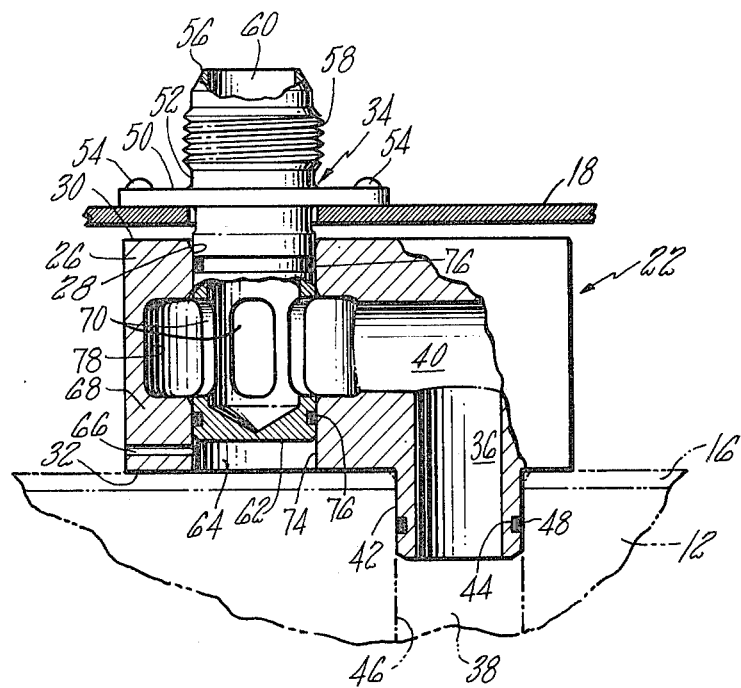
FIG. 2 is an enlarged cutaway view of the present invention showing the principal components therein.

Since the first and second pressure balancing fluid transfer manifolds 22, 24 are identical, only the first manifold 22 will be described in detail. Referring now to FIG. 2 which shows an enlarged cutaway view of the first pressure balancing fluid transfer manifold 22. The manifold includes a housing 26, having a first passage 28 extending from a top surface 30 to a bottom surface 32 of the housing, adapted for receiving an interface fitting 34 which is described hereinafter, a second passage 36 adapted for communicating with a coolant distribution passage 38 within the mirror 12, and a third passage 40, internal the housing, connecting the first passage with the second passage. The housing contains a protrusion 42, having an O-ring groove 44, extending from the bottom surface for connection to the coolant distribution passage 38. The protrusion sealably engages the interior surface 46 of the coolant distribution passage 38 with an O-ring type seal 48.

Figure 3:
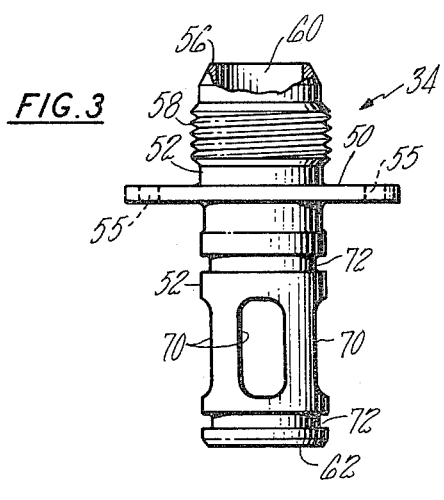
FIG. 3 is a side view of an interface fitting.

Referring now to FIGS. 2 and 3, a support flange 50 is fixedly attached to an exterior surface 52 of the cylindrical body of the interface fitting and is adapted for being secured to the mounting plate 18 by means well known in the art such as bolts 54 extending through the bolt holes 55 into the mounting plate. A first end 56 of the interface fitting has threads 58 for removable connection to coolant lines (not shown). A cylindrical bore 60 extends from the first end 56 concentrically along the longitudinal axis of the interface fitting and terminates short of a second end 62 to form a cylindrical cavity therein. The interface fitting extends sufficiently within the first passage to maintain a cavity 64 between the second end 62 and the backplate of the mirror 16. A vent hole 66 extends through the side wall 68 for venting the cavity 64 to the atmosphere. A plurality of elongated slots 70 are circumferentially disposed around the interface fitting proximate the second end and extend from the exterior surface 52 to the cylindrical bore 60. As shown in FIG. 2, the interface fitting is inserted into the first passage 28 within the housing 26 sufficiently to align the plurality of slots 70 with the third passage 40 within the housing. O-ring grooves 72 are located within the exterior surface 52 of the interface fitting above and below the slots 70. The interface fitting is sealably engaged with the interior suface 74 of the first passage 28 with O-rings 76 disposed within the O-ring grooves 72.

Figure 4:
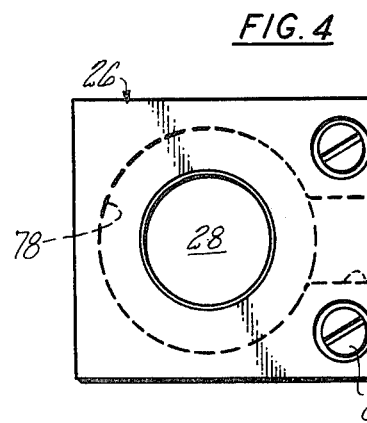
FIG. 4 is a top view of the housing adapted for engaging the interface fitting as shown in FIG. 3.

FIG. 4 shows a top view of the housing 26 showing the positional relationship of the first passage 28, the third passage 40 and the second passage 36. The third passage 40 has a first portion 78, circularly disposed about the first passage, adapted for collecting coolant passing from the slots 70 in the interface fitting. Bolts 80 are adapted for fixedly attaching the housing to the backplate 16 of the mirror.

In operation, coolant from a source (not shown) is directed to the interface fitting in the first manifold and passes through the cylindrical bore 60 through the slots 70 and into the third passage 40 which directs the fluid to the second passage 36 into the heat transfer distribution system 38 within the mirror 12. Upon passing through the heat transfer system within the mirror the coolant then passes through the second fluid transfer manifold in the reverse manner as hereinbefore described and passes out of the system to a heat exchanger means or the like for recirculation back through the first fluid transfer manifold. The fluid flowing through the manifolds results in hydraulic loads on the second surface 62 at the end of the interface fitting which are transmitted back through the interface fitting to the mounting plate 18 thereby minimizing any hydraulic load on the mirror 12. The cavity 64 located between the second surface 62 and the backplate 16 of the mirror decouples the hydraulic forces on the second surface 62 from the mirror. Vent means 66 is adapted for maintaining the cavity 64 at atmospheric pressure. The O-ring type engagement of the interface fitting with the interior walls 74 of the first passage 28 minimizes pressure loads on the mirror due to interface fitting misalignment. The interface fitting is fastened to the mounting plate 18 with bolts 54 such that the unbalanced pressure loads generated by the coolant flowing through the mirror system is carried by the mounting plate and not by the mirror and distortion of the mirror alignment is minimized. Additionally, the coolant enters and leaves the mirror through the transfer manifolds where unbalanced hydraulic pressures at the entrance and exit ports of the mirror are balanced to compensate for pressure drops along the coolant path such that unequal pressure loads are not applied on the mirror which would change its optical setting.

Figure 5:
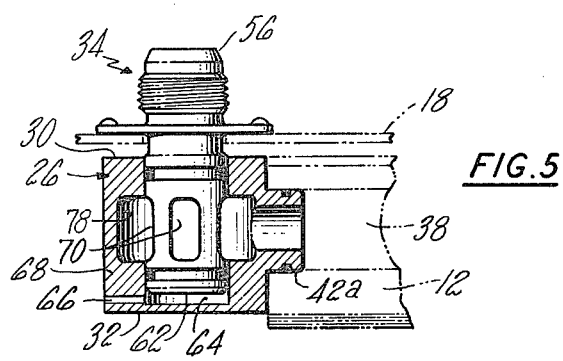
FIG. 5 shows an embodiment of the present invention adapted for insertion into the side of a mirror.

FIG. 5 shows an embodiment of the present invention wherein the protrusion 42a extending from the side wall 68, is adapted for insertion into the coolant distribution passage 38 through the side of the mirror. The first passage 28 is open at the top surface 30 of the housing and extends into the housing terminating short of the bottom surface 32 such that the cavity 64 is formed between the second surface 62 of the fitting and the bottom surface of the housing.

Figure 6:
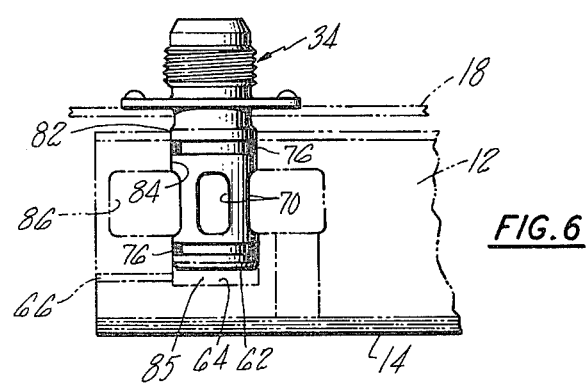
FIG. 6 is a further embodiment of the present invention showing the interface fitting inserted directly into the mirror.

FIG. 6 shows a further embodiment of the present invention wherein the interface fitting 34 is inserted directly into the mirror 12 through an entrance port 82 and is sealably engaged with the interior walls 84 of a first channel 85 within the mirror by the O-ring seals 76 as hereinbefore described. The cavity 64 between the second surface 62 of the fitting and the bottom of the first channel is vented to the atmosphere through a vent channel 66 within the mirror. The mirror contains an interior distribution cavity 86 circularly disposed about the first channel connecting the first channel with the coolant distribution passage 38 within the mirror. As hereinbefore discussed, the fitting is inserted into the first channel 85 sufficiently to align the slots 70 with the distribution cavity 86 and to maintain the cavity 64 at the bottom of the first channel. In this embodiment, the housing 26 as shown in FIG. 2 is eliminated with appropriate passages formed internal the mirror. The fitting is secured to mounting plate 18 as hereinbefore described. Similarly a second interface fitting substantially identical to the first interface fitting can be located within a second channel (not shown) connected to the exit port for passing coolant from the mirror.

Although this invention has been shown and described with respect to a preferred embodiment thereof, it should be understood by those skilled in the art that various changes and omissions in the form and detail thereof may be made therein without departing from the spirit and the scope of the invention.

Having thus described a typical embodiment of our invention, that which we claim as new and desire to secure by Letters Patent of the United States is:

1. A fluid transfer manifold adapted for isolating a mirror, adapted for being cooled with a coolant flowing therethrough, from hydraulic pressure loads resulting from the coolant flowing therethrough comprises:

a housing having a first passage, a second passage adapted for communicating with a heat exchanger distribution system within the mirror, a third passage internal to the housing connecting the first and second passages and adapted for passing coolant therebetween, means for attaching the housing to the mirror, a protrusion extending from a bottom surface of the housing and having the second passage passing therethrough said protrusion adapted for a slip fit engagement with the mirror for passing coolant therethrough, and means for venting the first passage to the atmosphere; and an interface fitting adapted for a slip fit engagement within the housing and for partial insertion into the first passage wherein the interface fitting has a cylindrical body with a bore centrally located therein along a longitudinal axis of the body extending from a first end adapted for connection to a source of coolant and terminating short of a second end of the interface fitting, a plurality of slots circumferentially disposed about the cylindrical body proximate to the second end adapted for passing coolant between the bore and the third passage within the housing and means for attaching the interface fitting to a mounting plate adapted for supporting the mirror.

2. The invention in accordance with claim 1 wherein the slip fit engagement of the interface fitting within the housing is an O-ring type seal disposed between the cylindrical body and an interior surface of the first passage.

3. The invention in accordance with claim 2 wherein the interface fitting, fixedly attached to the mounting plate, extends into the first passage sufficiently for the plurality of slots circumferentially disposed about the fitting to communicate with the third passage within the housing while maintaining a cavity between the second end of the fitting and the mirror.

4. The invention in accordance with claim 3 further including a vent hole in the housing passing from the cavity maintained between the end of the fitting and the structure to the atmosphere outside the housing adapted for maintaining the cavity at atmospheric pressure.

5. In combination, a laser mirror having an inlet port, an exit port and a coolant distribution passage located within the mirror adapted for passing a coolant between the inlet port and the exit port;

a mounting plate adapted for positioning the mirror;

means for securing the mirror to the mounting plate; and a first fluid transfer manifold adapted for communicating with the inlet port of the mirror comprising:

a housing having a first passage adapted for having an interface fitting inserted therein, a second passage adapted for communicating with the coolant distribution passage within the mirror, a third passage, internal to the housing connecting the first and second passage, adapted for passing coolant therebetween, means for fixedly attaching the housing to the mirror, and means within a side wall of the housing for venting the first passage to atmosphere outside the housing; and an interface fitting adapted for partial insertion into the first passage having a bore centrally located therein extending from a first end adapted for connection to a source of coolant and terminating short of a second end, means for passing coolant between the bore and the third passage within the housing, means for fixedly attaching the interface fitting to the mounting plate, and means for sealably engaging the interface fitting within the first passage within the housing.

6. The invention in accordance with claim 5 wherein the means for passing coolant between the bore and the third passage within the housing is a plurality of elongated slots circumferentially disposed about the interface fitting extending from an external surface to the bore.

7. The invention in accordance with claim 6 wherein the interface fitting extends sufficiently into the first passage of the housing for the elongated slots to communicate with the third passage while maintaining a cavity within the first passage between the second end of the fitting and a bottom surface of the housing wherein said cavity is vented to the atmosphere by the means for venting the first passage.

8. The invention in accordance with claim 5 wherein the means for sealably engaging the interface fitting within the first passage is an O-ring seal positioned above and below the means for passing the coolant between the bore and the third passage.

9. The invention in accordance with claim 5 further including a second fluid transfer manifold substantially identical to the first fluid transfer manifold communicating with the exit port of the mirror wherein the first and second fluid transfer manifolds are adapted for isolating the mirror from unbalanced hydraulic pressure loads resulting from coolant flowing through the mirror.

10. In combination, a laser mirror having an inlet port, a first channel connected to the inlet port, an exit port, a second channel connected to the exit port and a coolant distribution passage located within the mirror adapted for passing a coolant between the inlet port and the exit port, a mounting plate adapted for positioning the mirror, means for securing the mirror to the mounting plate and a first interface fitting partially inserted into the entrance port and sealably engaged therein with an O-ring seal wherein the interface fitting comprises:

a cylindrical body having a bore centrally located therein concentric about a longitudinal axis of the cylindrical body extending from a first end of the body and terminating short of a second end;

a support flange fixedly attached to the cylindrical body proximate the first end, adapted for fixedly attaching the interface fitting to the mounting plate;

means for attaching a source of coolant to the first end;

a plurality of slots circumferentially disposed around the cylindrical body intermediate the support flange and the second end, extending from an exterior surface of the cylindrical body to the bore wherein the plurality of slots communicate with the coolant distribution passage within the mirror; and O-ring grooves disposed circumferentially on the cylindrical body above and below the plurality of slots adapted for sealably engaging the interface fitting within the first channel.

11. The invention in accordance with claim 10 wherein the interface fitting is sealably engaged within the first channel forming a cavity between the second end of the fitting and a bottom of the first channel wherein the cavity is vented to the atmosphere by a vent hole within the mirror extending from the cavity to a surface of the mirror.

12. The invention in accordance with claim 11 further including a second interface fitting, substantially identical to the first interface fitting, sealably engaged within the second channel wherein the first and second interface fittings are adapted for isolating the mirror from unbalanced hydraulic pressure loads resulting from coolant flowing through the mirror.

13. A fluid transfer manifold adapted for isolating a mirror, adapted for being cooled with a coolant flowing therethrough, from hydraulic pressure loads resulting from the coolant flowing through the mirror comprises:

a housing having a first passage, a second passage adapted for communicating with a heat exchanger distribution system within the mirror, a third passage internal to the housing connecting the first and second passages and adapted for passing coolant therebetween, means for attaching the housing to the mirror, a protrusion extending from a side surface of the housing and having the second passage passing therethrough, said protrusion adapted for a slip fit engagement with the mirror for passing coolant therethrough, and means for venting the first passage to the atmosphere; and an interface fitting adapted for a slip fit engagement within the housing and for partial insertion into the first passage wherein the interface fitting has a cylindrical body with a bore centrally located therein along a longitudinal axis of the body extending from a first end adapted for connection to a source of coolant and terminating short of a second end of the interface fitting, a plurality of slots circumferentially disposed about the cylindrical body proximate to the second end adapted for passing coolant between the bore and the third passage within the housing and means for attaching the interface fitting to a mounting plate adapted for supporting the mirror.

* * * * *